United States Patent
Tsukamoto

(10) Patent No.: US 10,574,900 B2
(45) Date of Patent: Feb. 25, 2020

(54) OPTICAL INSTRUMENT AND CONTROL METHOD FOR APERTURE

(71) Applicant: OLYMPUS CORPORATION, Hachioji-shi, Tokyo (JP)

(72) Inventor: Ruiju Tsukamoto, Hino (JP)

(73) Assignee: Olympus Corporation, Tokyo (JP)

( * ) Notice: Subject to any disclaimer, the term of this patent is extended or adjusted under 35 U.S.C. 154(b) by 358 days.

(21) Appl. No.: 15/480,047

(22) Filed: Apr. 5, 2017

(65) Prior Publication Data

US 2017/0310867 A1 Oct. 26, 2017

(30) Foreign Application Priority Data

Apr. 21, 2016 (JP) .................... 2016-085452

(51) Int. Cl.
| | |
|---|---|
| H04N 5/238 | (2006.01) |
| G02B 5/00 | (2006.01) |
| G02B 7/04 | (2006.01) |
| G03B 9/06 | (2006.01) |
| G03B 13/34 | (2006.01) |
| H04N 5/232 | (2006.01) |

(52) U.S. Cl.
CPC ............ *H04N 5/238* (2013.01); *G02B 5/005* (2013.01); *G02B 7/04* (2013.01); *G03B 9/06* (2013.01); *G03B 13/34* (2013.01); *H04N 5/23245* (2013.01)

(58) Field of Classification Search
CPC .............. H04N 5/238; H04N 5/23251; H04N 5/23261; G03B 9/00–07; G03B 3/00–10; G03B 17/04; G03B 2217/005; G02B 7/04; G02B 7/09; G02B 7/023
USPC ................ 359/739, 624; 348/208.4–208.11; 396/52–55, 348–350
See application file for complete search history.

(56) References Cited

U.S. PATENT DOCUMENTS

| | | | |
|---|---|---|---|
| 2011/0310457 A1* | 12/2011 | Sasaki ...................... | G03B 9/02 359/230 |
| 2014/0079380 A1 | 3/2014 | Taguchi | |
| 2015/0326772 A1* | 11/2015 | Kazami ............... | H04N 5/2352 348/252 |

\* cited by examiner

*Primary Examiner* — Kristina M Deherrera
(74) *Attorney, Agent, or Firm* — John C. Pokotylo; Pokotylo Patent Services

(57) ABSTRACT

An optical instrument, comprising an optical system including a focus lens group, an aperture that restricts light flux that passes through the optical system, an aperture motor that sets opening amount for the aperture, a memory that stores first information that represents a relationship between position of the focus lens group and appropriate aperture value and second information that represents a relationship between the aperture value and opening amount of the aperture, and a controller that, when controlling opening amount of the aperture using the aperture motor in accordance with position of the focus lens group, calculates an appropriate aperture value based on the first information and position of the focus lens group, calculates opening amount of the aperture based on the second information and the aperture value that has been calculated, and controls the opening amount to the opening amount of the aperture that has been calculated.

9 Claims, 12 Drawing Sheets

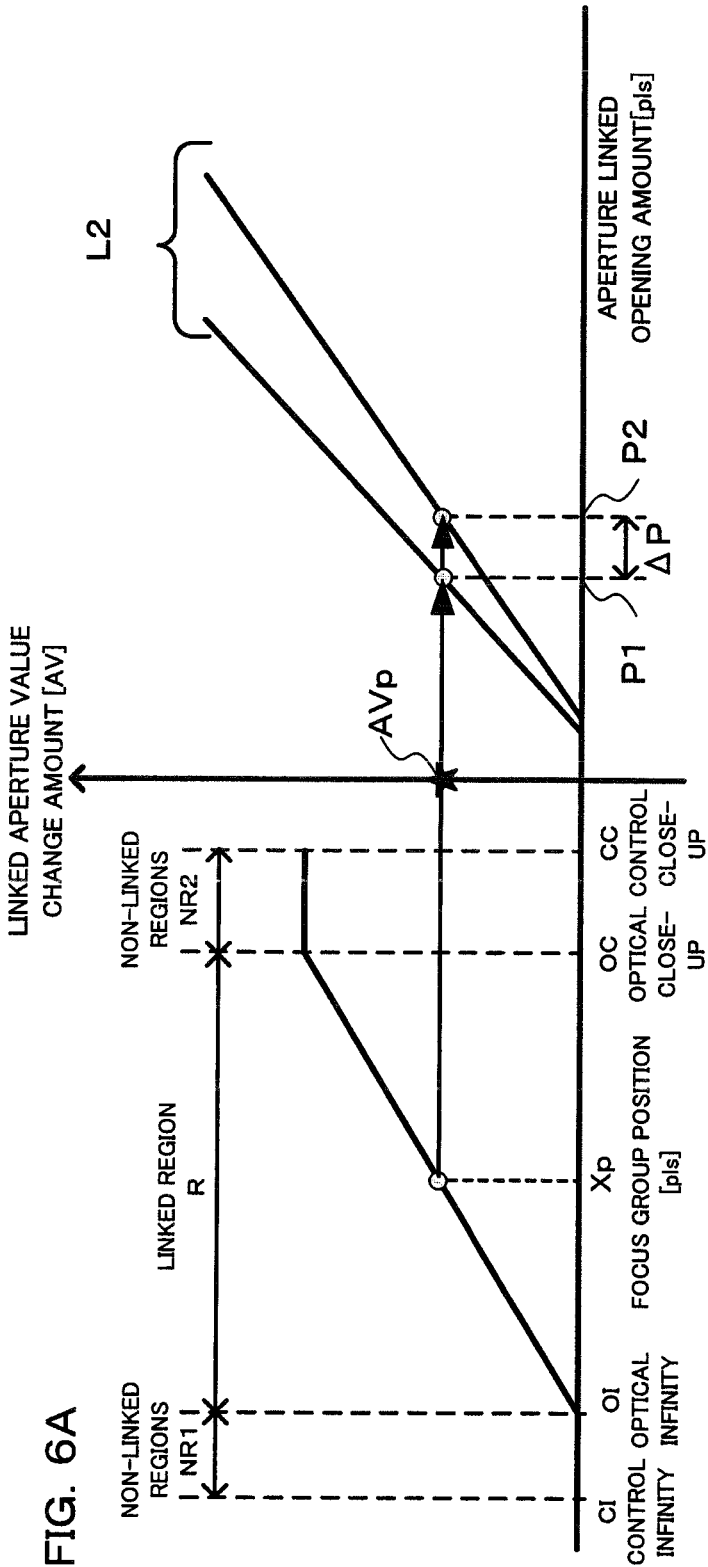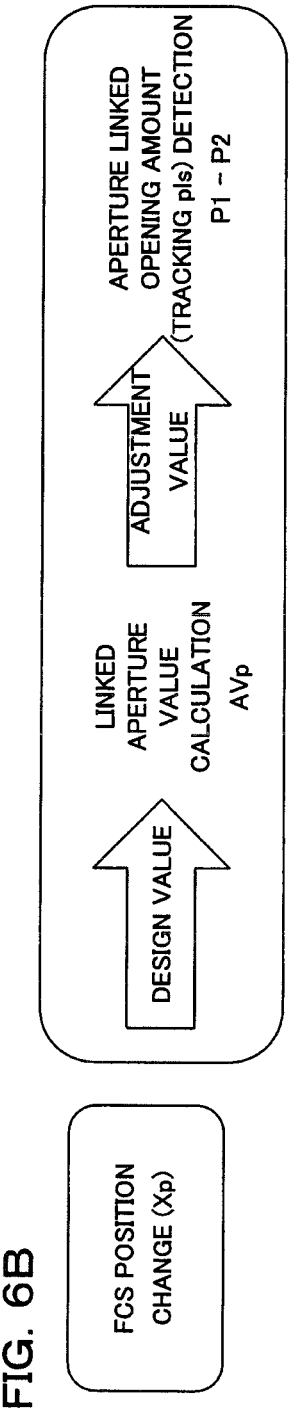
FIG. 6A
FIG. 6B

OPTICAL INSTRUMENT AND CONTROL METHOD FOR APERTURE

Benefit is claimed, under 35 U.S.C. § 119, to the filing date of prior Japanese Patent Application No. 2016-085452 filed on Apr. 21, 2016. This application is expressly incorporated herein by reference. The scope of the present invention is not limited to any requirements of the specific embodiments described in the application.

BACKGROUND OF THE INVENTION

1. Field of the Invention

The present invention relates to an optical instrument and a control method for an aperture that carry out fine control of an aperture using actuators such as stepping motors.

2. Description of the Related Art

An aperture unit for controlling light amount passing through an optical system is provided within the optical instrument. A focus lens group is also provided, and has an optical system capable of macro shooting. It is known that with this optical system aperture value changes accompanying movement of the focus lens group. This change in aperture value is a contributing factor to fundamental optical phenomena, such as reducing image plane light amount if shooting magnification factor becomes high. Conventionally, aperture opening amount has been subjected to mechanical drive control by being linked to movement of the focus lens group by a cam mechanism. However, in recent years optical instruments have been proposed in which movement of a focus lens group has been detected without adopting this type of cam mechanism that is linked to the focus lens group, and aperture opening amount is controlled in accordance with the movement amount (refer to Japanese Patent Laid-open No. 2014-059407 (hereafter referred to as "patent publication 1")).

SUMMARY OF THE INVENTION

An optical instrument of a first aspect of the present invention comprises, an optical system including a focus lens group, an aperture that restricts light flux that passes through the optical system, a focus lens motor that causes the focus lens group to move in an optical axis direction, an aperture motor that sets the aperture opening amount, and a memory that stores first information that represents a relationship between position of the focus lens group and appropriate aperture value, and second information that represents a relationship between the aperture value and opening amount of the aperture, and comprises a controller that controls opening amount of the aperture using the aperture motor, in accordance with position of the focus lens group that has been moved by the focus lens motor, wherein the controller calculates an appropriate aperture value based on the first information and position of the focus lens group, calculates aperture opening amount based on the second information and the aperture value that has been calculated, and controls opening amount to the opening amount of the aperture that has been calculated.

An aperture control method of a second aspect of the present invention is an aperture control method for an optical instrument having an optical system including a focus lens group, an aperture that restricts light flux that passes through the optical system, a focus lens motor that causes the focus lens group to move in an optical axis direction, an aperture motor that opening amount for the aperture, and a memory that stores first information that represents a relationship between position of the focus lens group and appropriate aperture value and second information that represents a relationship between the aperture value and opening amount of the aperture, calculating an appropriate aperture value based on the first information and position of the focus lens group that has been moved by the focus lens motor, calculating opening amount of the aperture based on the second information and the aperture value that has been calculated, and controlling the opening amount of the aperture using the aperture motor.

BRIEF DESCRIPTION OF THE DRAWINGS

FIG. 6A and FIG. 6B are drawings for explaining aperture opening amount control in a camera of one embodiment of the present invention.

DETAILED DESCRIPTION OF THE PREFERRED EMBODIMENTS

Figure 1:
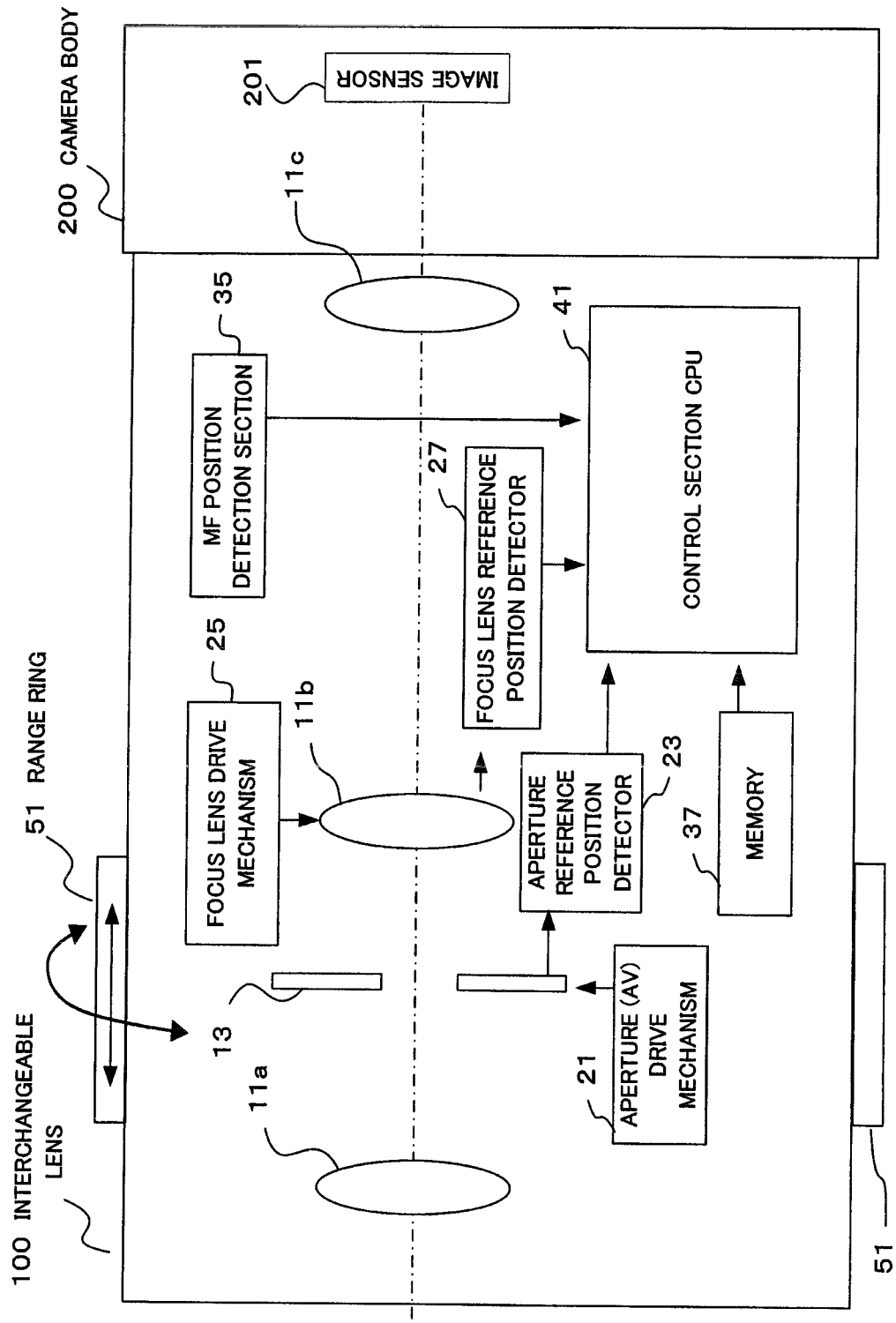
FIG. 1 is a block diagram showing the structure of a camera of one embodiment of the present invention.
Figure 2:
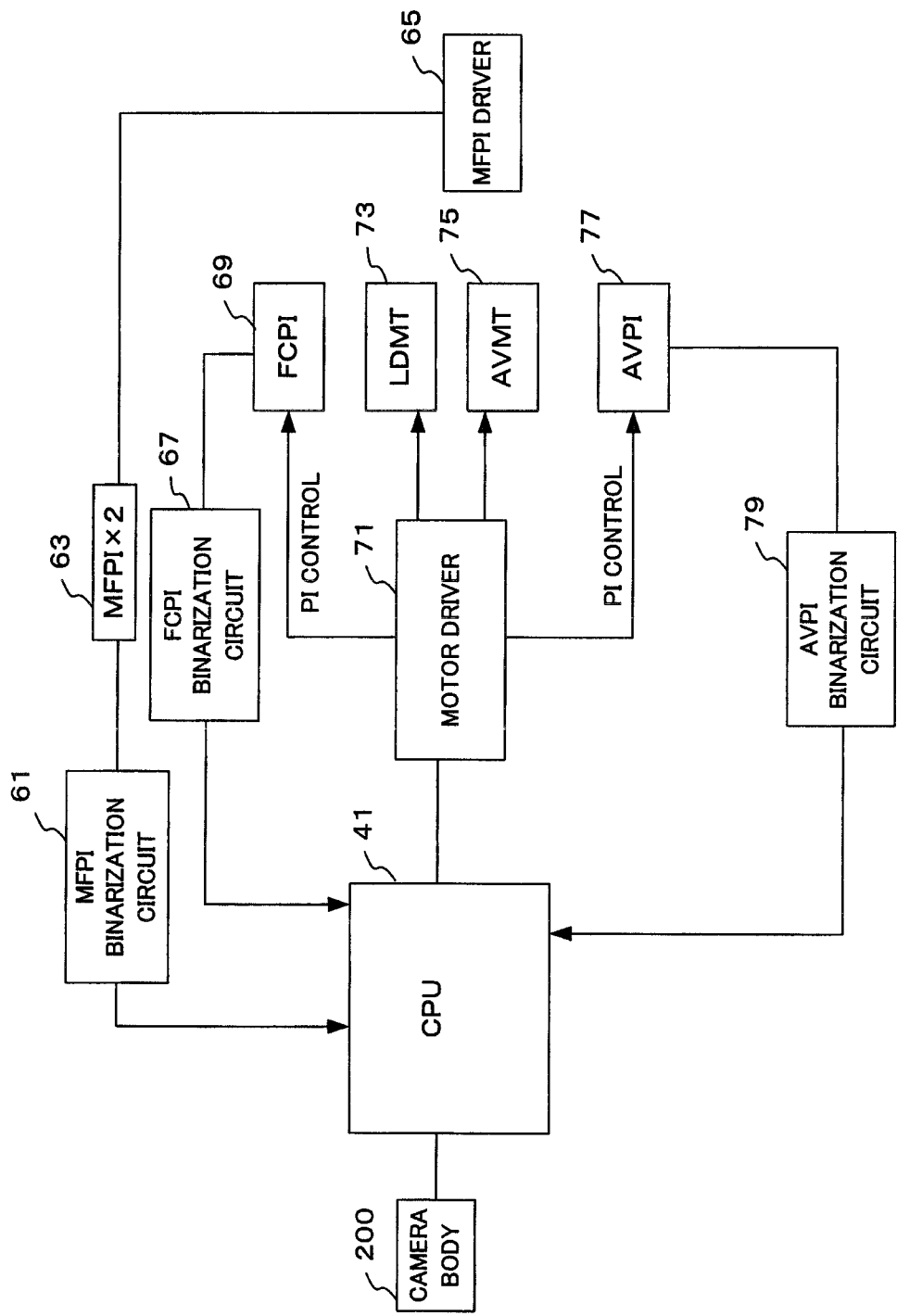
FIG. 2 is a block diagram mainly showing the electrical structure of a camera of one embodiment of the present invention.

Preferred embodiments using a camera to which the present invention has been applied will be described in the following in accordance with the drawings. FIG. 1 is a block diagram showing the structure of a camera of one embodiment of the present invention, and FIG. 2 is a block diagram showing the electrical structure of this camera. This camera comprises an interchangeable lens 100 and a camera body 200. It is also possible, however, for the lens barrel and the camera body to be integrally formed.

A photographing lens 11 made up of lenses 11a to 11c is provided within the interchangeable lens 100. A subject image is formed by the photographing lens 11. Within this lens 11, a focus lens 11b (also called a focus lens group) is a lens for focus adjustment, and is capable of being moved in the optical axis direction by a focus lens drive mechanism 25. The photographing lens 11 functions as an optical system including a focus lens group. It should be noted that with this embodiment, the photographing lens 11 is described as a focus adjustment lens, but some of the lenses 11a-11c may be made zoom lenses for changing focal length. In this case, a zoom ring or the like is provided in order to change the focal length.

The focus lens drive mechanism 25 has a focus lens actuator and a focus lens drive circuit. The focus lens drive mechanism 25 functions as a focus lens motor for causing movement of the focus lens group in the optical axis direction.

A focus lens reference position detector 27 outputs a detection signal to a CPU 41, which is a control section, if the focus lens 11b reaches a reference position. A photo interrupter (PI) is used in reference position detection. With this embodiment, once the reference position has been detected, position detection of the focus lens 11b is carried out based on number of pulses applied to an actuator (using a pulse motor) for the focus lens with that position as a reference. Besides detecting relative position with this number of applied pulses, it is also possible, for example, to detect a pattern that is coupled to a drive mechanism of the focus lens 11b using a photo reflector, movement of a light shielding blade that is coupled to the drive mechanism may be detected using a photo interrupter, and detection may be performed using a sensor such as a GMR (Giant Magneto Resistance) that is coupled to and rotates with the drive mechanism.

An aperture 13 is arranged between the lens 11a and the lens 11b. The aperture 13 functions as an aperture for restricting light flux that passes through the optical system. The aperture 13 has an opening diameter varied by an aperture drive mechanism 21, to vary an amount of subject light that passes through the photographing lens 11. The aperture drive mechanism 21 has an aperture actuator and an aperture drive circuit etc. A stepping motor is used as the actuator in this embodiment, and fine control is carried out using micro step drive. Movement by the actuator is converted into an opening closing operation of aperture blades using a cam.

The aperture drive mechanism 21 functions as an aperture motor for setting aperture opening amount. It should be noted that the aperture 13 may also be arranged at a position other than between the lens 11a and the lens 11b. Also, opening and closing drive for the blades of the aperture may be carried out directly, without using a cam. Also, the actuator is not limited to a stepping motor and another motor may be adopted.

An aperture reference position detection section 23 outputs a detection signal to the CPU 41 if the aperture opening diameter reaches a reference position. A reference position for opening position is acquired by the reference position detection section 23, and opening position is controlled by relative position detection. Relative position detection involves detection using a number of pulses applied to a stepping motor, while reference position detection involves detection using a photo interrupter (PI). Opening amount of the aperture 13 is controlled in term of a value (pls) that is based on a number of pulses applied to the stepping motor from a reference position. This opening amount control will be described later.

A range ring 51 is arranged around the periphery of the interchangeable lens 100. The range ring 51 is constructed to freely turn around the periphery of the interchangeable lens 100. In the event that focus setting of the interchangeable lens 100 is that it has been set to manual focus mode (MF mode), focusing is carried out in accordance with a rotation direction and rotation amount of the range ring 51 by the user. Specifically, movement amount and movement direction of the focus lens 11b for focus adjustment are instructed by operation of the range ring 51.

An MF position detector 35 detects rotation direction and rotation amount of the range ring 51. The CPU 41 carries out manual focus control based on the results of detecting rotation direction and rotation amount from this MF position detector 35. If MF mode is set, light shielding blades at an inner side of the range ring 51 rotate as one with rotation of the range ring 51. The CPU 41 counts a number of times that conversion of an output signal of the photo interrupter (PI) repeats accompanying a rotation operation of the light shielding blades inside the MF position detector 35, and drives the focus lens 11b in accordance with this count value. It should be noted that rotation direction and rotation amount of the range ring 51 may also be detected by a sensor other than a photo interrupter.

A memory 37 is a rewritable nonvolatile memory, such as flash memory 37 etc., and stores programs for the CPU 41, various information such as optical data of the interchangeable lens, various adjustment values, and various parameters etc.

Figure 9:
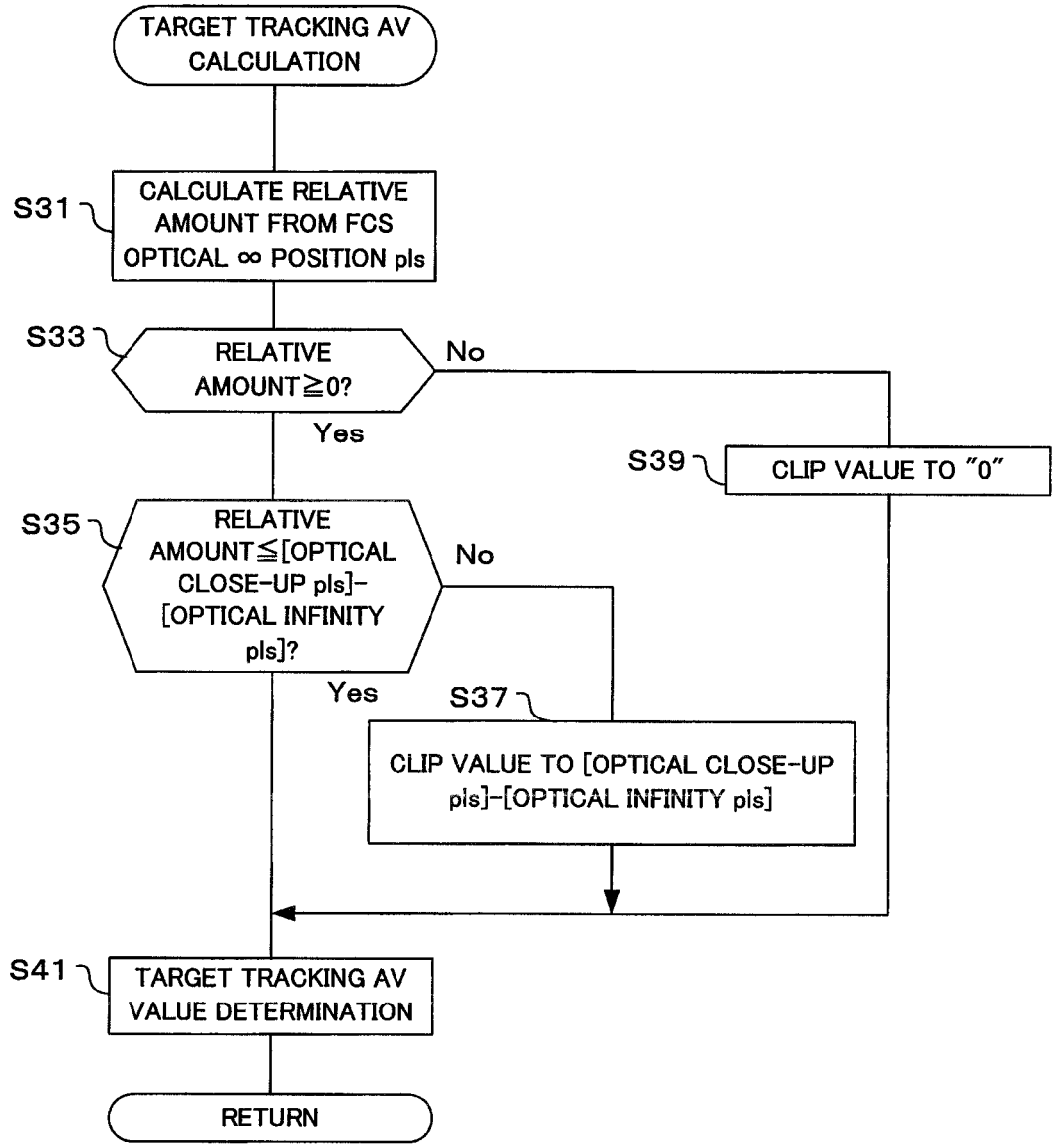
FIG. 9 is a flowchart for explaining operation of a target tracking AV calculation, in a camera of one embodiment of the present invention.
Figure 10:
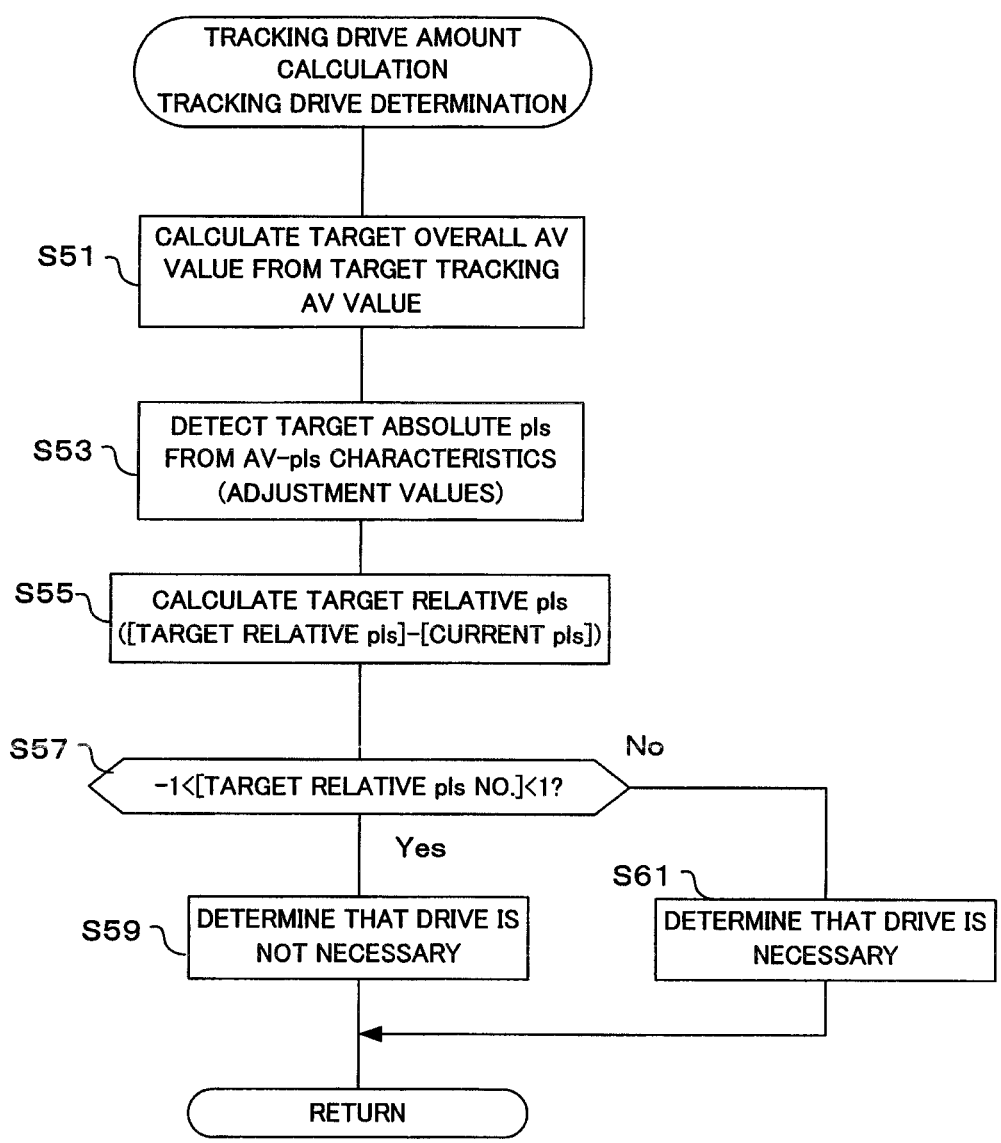
FIG. 10 is a flowchart for explaining operation for tracking drive amount calculation and a tracking drive determination operation, in a camera of one embodiment of the present invention.

The memory 37 also stores first information representing a relationship between position of the focus lens group and appropriate aperture value (refer to the second quadrant portion of FIG. 6A and S41 in FIG. 9), and second information representing a relationship between aperture value and aperture opening amount (refer to the first quadrant portion of FIG. 6A and S55 in FIG. 10). This memory 37 stores a first position corresponding to an optical close-up position of the focus lens group (refer to optical close-up OC etc. in FIG. 6A), and a second position corresponding to an optical infinity position (refer to optical infinity OI etc. in FIG. 6A). In the event that the photographing lens 11 is configured with a zoom optical system, the memory 37 stores the first information and the second information in correspondence with zoom position from the zoom optical system.

In accordance with a program stored in the previously described memory 37, the CPU 41, which is a controller, carries out control within the interchangeable lens 100 in response to control instructions from the camera body 200. The controller has not just a CPU (central Processing Unit) but also peripheral circuits for the CPU. The CPU 41 is input with detection signals from the aperture reference position detector 23, focus lens reference position detector 27, and the MF position detector 35, and outputs control signals to the focus lens drive mechanism 25 and the aperture drive mechanism 21.

Figure 8:
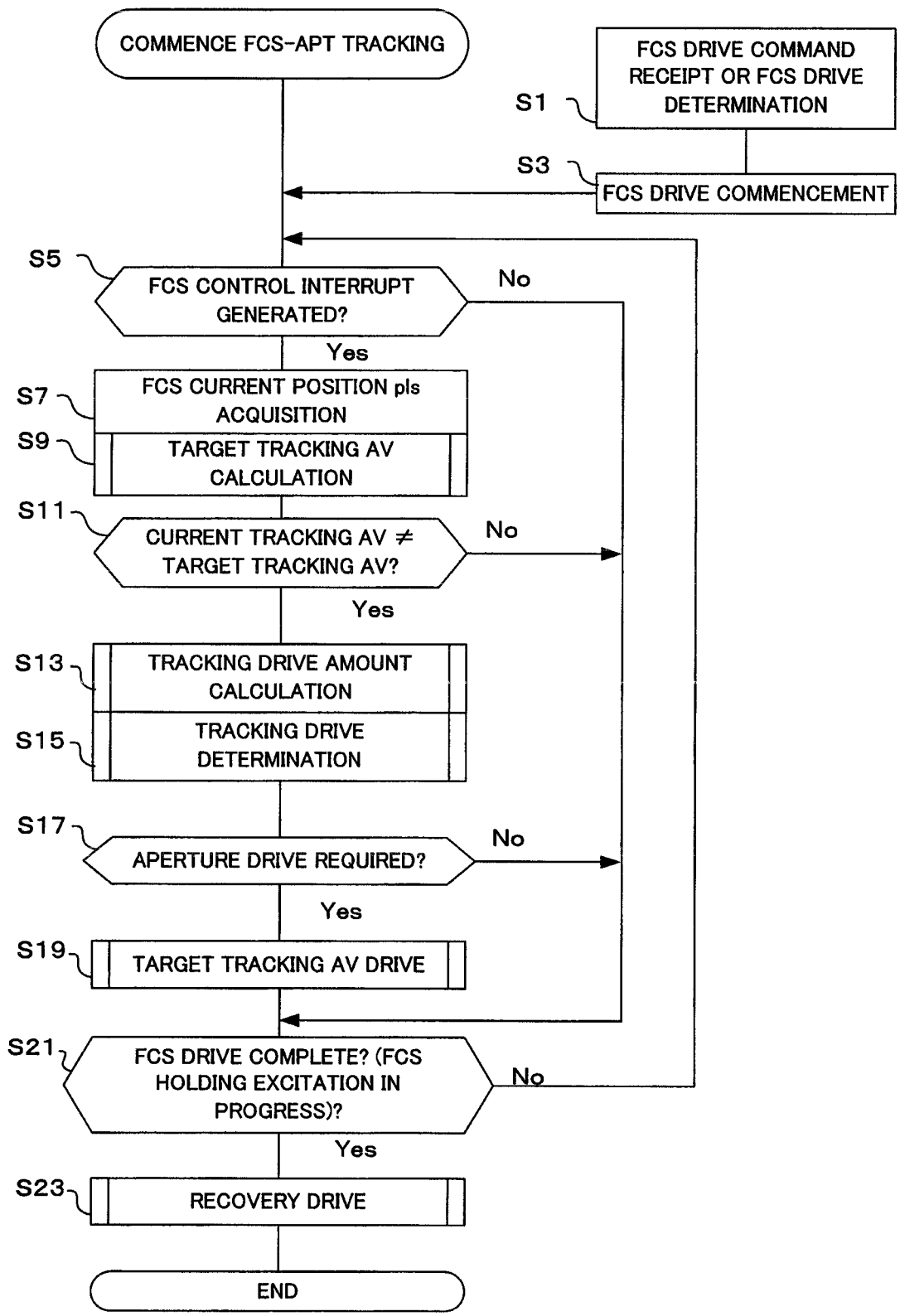
FIG. 8 is a flowchart for explaining an aperture tracking operation, in a camera of one embodiment of the present invention.

The CPU 41, which is a controller, functions as a controller for controlling aperture opening amount using the aperture motor in response to position of the focus lens group that has been moved by the focus lens motor (refer, for example, to S9, S13 and S19 in FIG. 8). This controller also calculates appropriate aperture value based on the first information and position of the focus lens group (refer, for example, to S9 in FIG. 8 and S41 in FIG. 9), calculates aperture opening amount based on the second information and the aperture value that has been calculated, and controls aperture opening amount to the opening amount that has been calculated (refer, for example, to S13 and S19 in FIG. 8).

Also, the controller, in a case where position of the focus lens group that is driven by the focus lens motor is not between a first position and a second position, controls the aperture opening amount to an aperture value corresponding to the first position or an aperture value corresponding to the second position (refer, for example, to S39 and S37 in FIG. 9).

An image sensor 201 is arranged inside the camera body 200. This image sensor 201 is arranged close to an image forming position of the photographing lens 11, a subject image formed by the photographing lens 11 is subjected to photoelectric conversion, and image data is output. A control CPU and peripheral circuits for the control CPU are also provided inside the camera body 200, and carry out communication with the CPU 41 within the interchangeable lens 100.

Next, the detailed structure of electrical blocks will be described using FIG. 2. As described previously, the CPU 41 is capable of communication with the camera body 200. The CPU 41 is also connected to a motor driver 71, and this motor driver 71 carries out drive of an FCPI 69, LDMT 73, AVMT 75 and AVPI 77.

The FCPI 69 is a photo interrupter for reference position detection of the focus lens 11b, and output of this FCPI 69 is connected to an FCPI binarization circuit 67. The FCPI 69 and the FCPI binarization circuit 67 correspond to the previously described focus lens reference position detector 27.

The LDMT 73 is a lens drive motor (LD motor), and functions as the previously described focus actuator within the focus lens drive mechanism 25. In this embodiment a stepping motor is adopted as the LD motor, but it is also possible to use another motor such as a general purpose DC motor or a voice coil motor, for example.

The AVMT 75 is an aperture motor, and is the previously described aperture actuator within the aperture drive mechanism 21. With this embodiment, as previously described, a stepping motor is used as the aperture actuator, and pulses are applied from a motor driver 71 to change the opening diameter of the aperture 13.

The AVPI 77 is a photo interrupter for reference position detection of the aperture 13, and output of this AVPI 77 is connected to an AVPI binarization circuit 79. The AVPI 77 and AVPI binarization circuit 79 correspond to the previously described aperture reference position detector 23.

An MFPI driver 65 is a driver for the MFPI 63 for detecting turning of the range ring 51 in a case where MF mode has been set. The MFPI 63 is a photo interrupter, and is provided at two locations along the turning direction of the light shielding blades. Output of this MFPI 63 is connected to an MFPI binarization circuit 61, and binarized by the MFPI binarization circuit 61. The MFPI binarization circuit 61, MFPI 63, and MFPI driver 65 correspond to the previously described MF position detector 35.

Next, in preparation for describing operation of this embodiment, matters relating to an aperture will be described. With this embodiment, position information of the aperture is managed as an AV value. Here an AV value is a value representing aperture value (F No) in an apex system. This AV value is used when calculating aperture value for correct exposure etc. and when setting aperture value manually.

Within the interchangeable lens 100, the aperture 13 is subjected to drive control by a stepping motor within the aperture drive mechanism 21, and so opening position is controlled by motor rotation amount. Regarding rotation amount of the motor, with this embodiment, for example, a drive amount that results in 1/256th of a microstep of the stepping motor corresponds to 1 pls. A relationship between pls position and AV value (mechanical characteristic) is therefore stored as adjustment values, and aperture control is carried out using the adjustment values.

Also, with this embodiment, rotation direction of the motor and movement of the aperture blades are as follows. In a case where motor rotation direction is forward (clockwise: CW) the aperture blades move in an opening direction, while a case where motor rotation direction is backward (counter clockwise: CCW) the aperture blades move in a closing up direction.

Also, with this embodiment, the aperture (blades) positions represented by pls, corresponding to respective positions of 1) a mechanical terminal position in an opening direction, 2) a moving controllable limit position in an opening direction, 3) an operation maximum opening position, 4) reset position, 5) an operation minimum opening position, 6) a moving controllable limit position in a closing direction (a moving controllable minimum opening position), and 7) mechanical terminal (or limit) position in a closing direction, of the aperture 13, are allocated as design values. These positions are determined with a reference position (reset position) that is detected by the photo interrupter AVPI 77 within the aperture reference position detector 23 as a reference, and offset between a design value and an actual reset position is adjusted using adjustment values. Also, respective AV values and F Nos. are allocated between the operation maximum opening position and the operation minimum opening position of the aperture 13.

In this specification, a valid AV value [AV] means an apex value corresponding to F No. of a lens for the current lens conditions (focus position, aperture diameter). An infinity AV value [AV] means an apex value corresponding to F No. of a lens when the focus lens 11b has been moved to an infinity position. The infinity AV value is dependent on position of the focus lens 11b, and in a case where the F No. changes, it becomes a value that takes this into account. A tracking AV value [AV] mean an AV value that tracks in association with position of the focus lens 11b. An aperture value that has been subjected to adjustment is called a controlled aperture value [AV].

Next, aperture adjustment will be described using FIG. 3A and FIG. 3B. With this embodiment, as was described previously, an aperture value that has been subjected to adjustment is called a controlled aperture value. An adjustment value for this purpose is calculated as follows.

The opening position of the aperture 13 is controlled using pulses (pls) applied to the stepping motor. When the aperture is driven in an opening direction, and when driven in a closing direction, AV values will be different even if stopped at the same pls position, as shown in FIG. 3A. Specifically, in FIG. 3A black circles are measurement values of aperture value [Av] for opening position [pls] when the aperture 13 is driven in an opening direction, and a dashed line Lcw is a line joining these measurement values. Also, black squares are measurement values of aperture value [Av] for opening position [pls] when the aperture 13 is driven in a closing direction, and a dashed line Lccw is a line joining these measurement values.

Av values are measured when the aperture 13 is stopped at the same pls position in two directions, namely in an opening direction and a in closing direction, and a center value is made an adjustment value. For example, when an aperture opening amount [pls] is an X step position, if a measurement AV value in an opening direction is made AVoo (X) and a measurement AV value in a closing direction is made Avcc(X), adjustment value AV (X) is calculated using equation (1) below.

$$AV(X)=\{AVoo(X)+AVcc(X)\}/2 \quad (1)$$

Figures 3A, 3B:
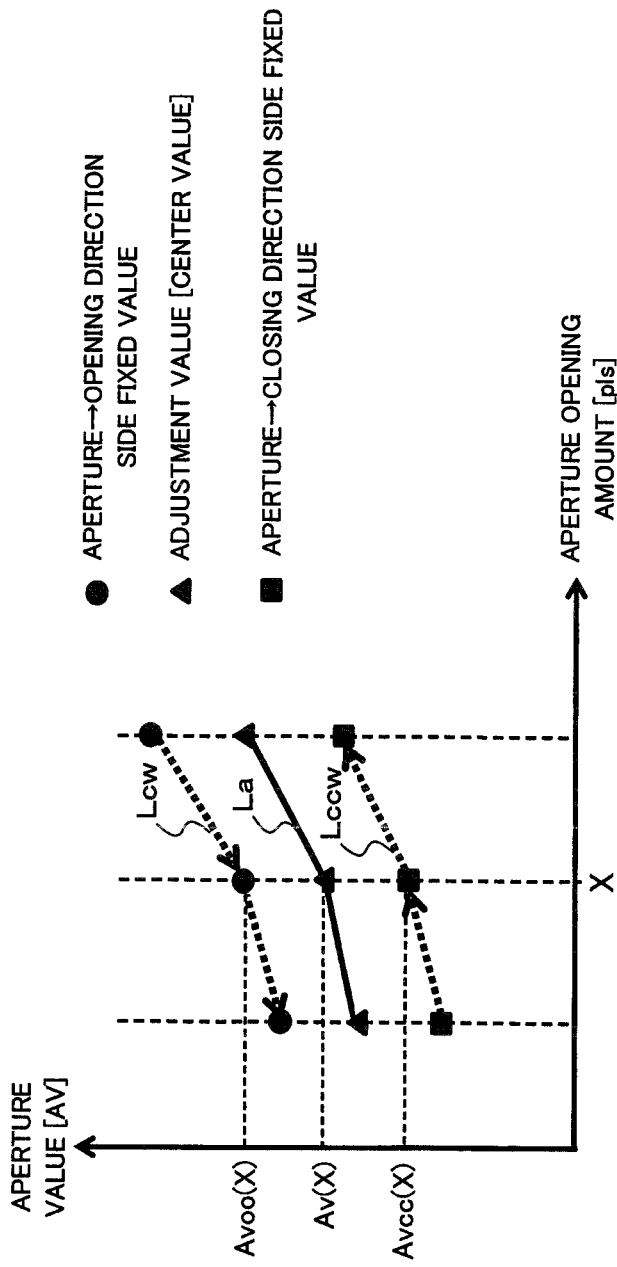
FIG. 3A and FIG. 3B are a graph and a table for explaining aperture control value of a camera of one embodiment of the present invention.

Black triangles in FIG. 3A represent adjustment values that have been calculated using equation (1), and the solid line La is a line joining these adjustment values.

FIG. 3B is a table showing one example of aperture opening position, corresponding aperture value measurement values and adjustment values. In FIG. 3B, aperture pls representing aperture opening position may be made, for example, $1/256$th of a micro step, and values between each aperture open position may by a linearly interpolated. If linearity of an aperture blade cam is good, adjustment points may be thinned out, or need not be on a straight line and may be thinned out as long as they can be obtained using an approximation equation.

In this way, with this embodiment, a relationship between aperture pls and AV value for each drive direction is stored as adjustment values. In this case, there is also an adjustment method for canceling backlash that arises due to reversal of drive direction, by switching a table each time drive direction is reversed. However, when carrying out focus-aperture tracking control, there is a problem that the time for canceling backlash may constitute tracking delay. Therefore, with this embodiment backlash that results is kept within a permissible error by urging the aperture blades of the aperture 13 with a spring. Control capable of real time drive (rapid tracking) is then carried out without canceling backlash even if drive direction is reversed.

Next focus lens position-aperture tracking control of this embodiment will be described. When the focus lens group moves from infinity towards close-up, from an optical design viewpoint there is potential for errors such as spherical aberration and comatic aberration to occur, and for image resolution to be lowered. In this type of situation, in order to keep image resolution at a constant level, it is desirable to vary (track) aperture value in accordance with focus lens position. In particular, in the case of a lens such as a macro lens, it is extremely easy for aberration to arise.

Also, in the case of both still picture shooting and movie shooting, it is desirable to carry out focus lens position-aperture tracking control. It is therefore desirable to take into consideration suppression of screen flicker and drive noise due to aperture drive, and it is better to carry out focusing control that is particularly suited to a focus lens drive method.

Figure 4:
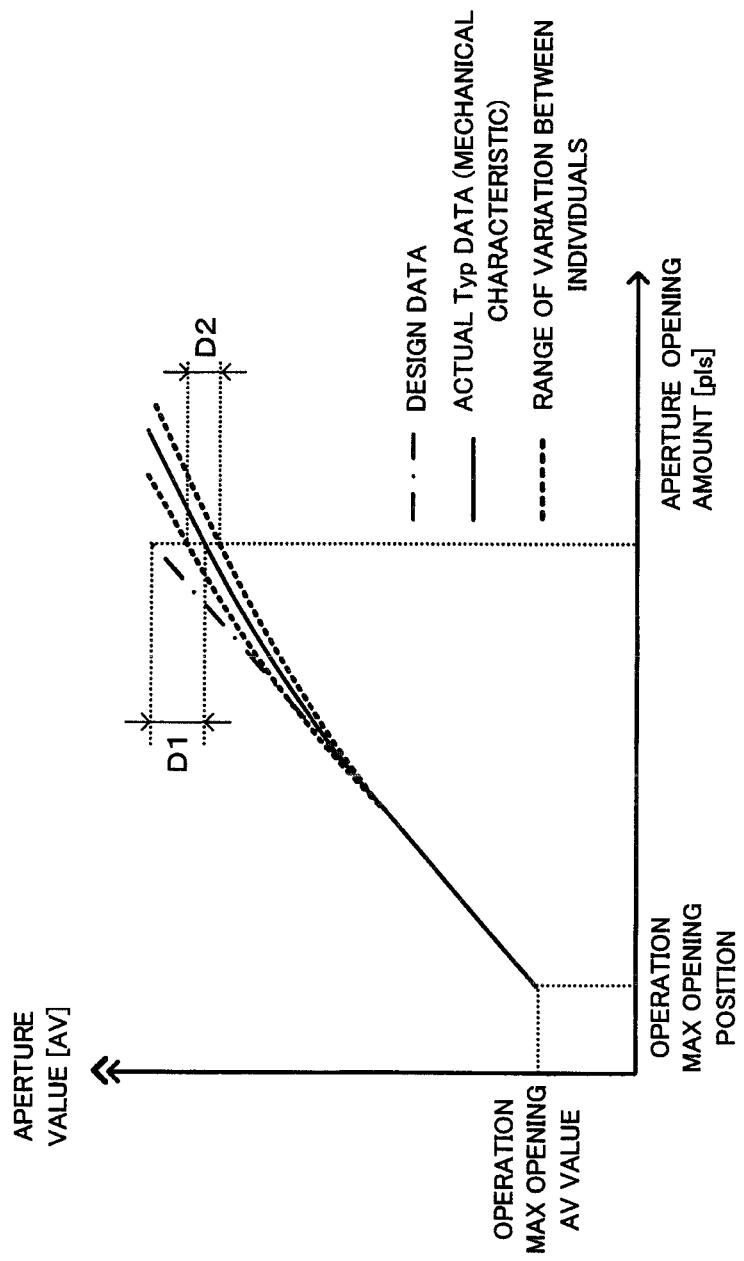
FIG. 4 is a graph showing a relationship between a number of pulses applied to an aperture drive stepping motor and actual aperture value, in a camera of one embodiment of the present invention.

Further, the aperture 13 varies aperture diameter by driving a plurality of aperture blades in an overlapped manner. With this structure, as aperture diameter becomes smaller it becomes more likely that the effects of friction due to the overlapping of blades will be felt, and as shown in FIG. 4 there is a characteristic where an amount of variation in aperture value (AV value) for every aperture opening amount 1 pls is reduced. Also, this characteristic is subject to variation between individual lenses. This point will be described using FIG. 4.

In FIG. 4 the horizontal axis is aperture opening amount pls and the vertical axis is aperture value AV. If the aperture is closed up and the aperture value becomes large, that is, the aperture blades is approached to move a minimum opening position, the plurality of aperture blades overlap and are subjected to the effects of friction, and the actual aperture value deviates from a design value. There is also a variation in actual aperture value between individual apertures. In FIG. 4, design values are shown by a dot and dash line, variations in actual aperture value for each individual aperture are shown by a dashed line, and representative values for aperture values that have taken variation into consideration are shown by a solid line. Also, a difference between aperture value design values and representative values of actual aperture value is shown as D1, and individual difference is shown as D2.

Figure 5A:
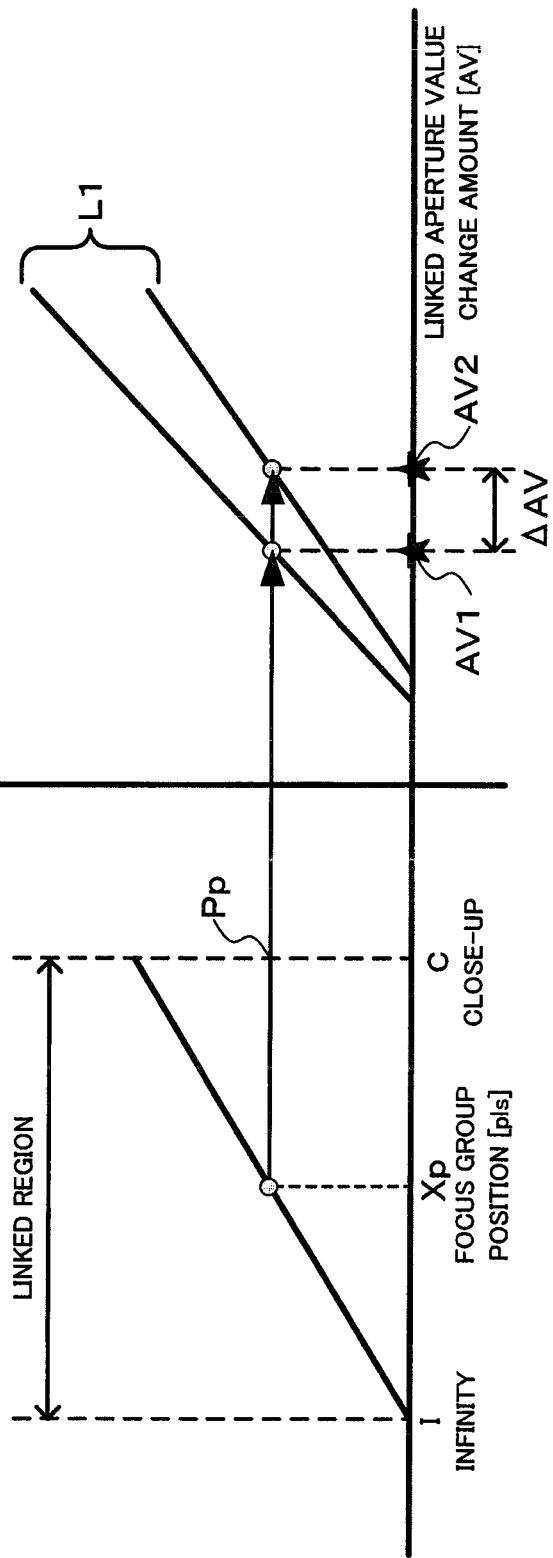
FIG. 5A and FIG. 5B are drawings for explaining aperture opening amount control in a conventional aperture unit.
Figure 5B:
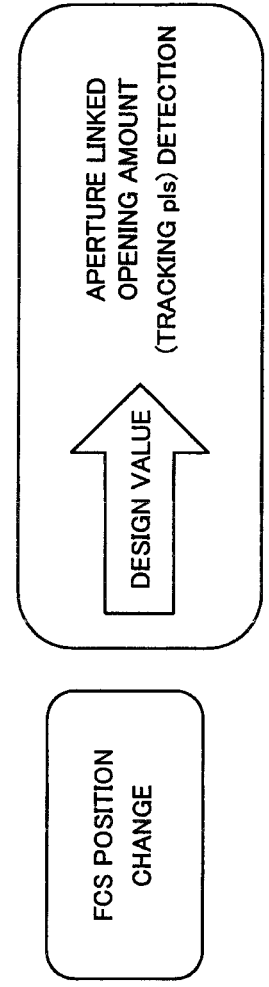

In controlling an aperture having this type of characteristic, conventionally correlation with aperture drive for changing focus lens position is stored in a table as design values in pls units, and used to adjusted aperture opening amount (refer to FIG. 5B). Specifically, as shown in FIG. 5A, amount of change in aperture value has been adjusted in response to position of the focus lens group. With the example shown in FIG. 5A, if position of the focus lens group is made Xp, an aperture linked opening amount Pp corresponding to this position is read out by table reference as a design value for adjustment, and the aperture opening amounts Av1-Av2 are adjusted.

However, as shown in FIG. 5A, linked aperture value change lines L1 are characteristic variation for individual products, and there is a difference between design and mechanical characteristics of individual products, which is why it is not a single line. This means that with the conventional way of doing things characteristic variation between individual products adversely constitutes difference in aperture value (ΔAV) directly.

With the conventional way of doing things, the previously described aperture opening amount (pls) and mechanical characteristic for aperture value (AV value) are subject to the effects of variation between individual products, and in particular in a case of closing down to the maximum aperture value (for example, F22) and the focus lens position being in a close-up region, there will be offset with respect to a target aperture value.

Therefore, with this embodiment:

(1) a correlation between necessary aperture value change amount with respect to change in focus lens position is held in AV units as design values (with the above described conventional method, held in pls units)

(2) a correlation between drive pls (opening amount) and a mechanical characteristic for AV value (aperture value) is held as adjustment values for each individual product (with the above described conventional method, adjustment values for each individual product are not held).

Specifically, with this embodiment, precision of aperture value to be tracked is improved by, each time focus lens position change is detected, calculating linked aperture value change amount [AV] using (1) described above, and aperture linked opening amount [pls] for driving is obtained using (2) described above with this calculated linked aperture value change amount (refer to FIG. 6B).

Control of aperture linked opening amount [pls] corresponding to change in focus lens position of this embodiment will now be described using FIG. 6A and FIG. 6B. The horizontal axis of the left side of FIG. 6A (second quadrant of the graph) is focus lens position (shown in pls units), and the vertical axis is linked aperture value change amount (shown in AV units). With this embodiment, the focus lens 11b is capable of movement up to a limit infinity CI which is further to the infinity side than optical infinity (OI) (this region is referred to as non-linked region NR1). Similarly, the focus lens 11b is capable of movement further to a limit close-up CC than optical close-up OC (this region is referred to as non-linked region NR2). The focus lens 11b has focus position that changes between optical infinity OI and optical close-up OC, and this region is referred to as linked region R.

Also, the horizontal axis on the right side in FIG. 6a (the first quadrant of the graph) is aperture linked opening amount (shown in pls units) and the vertical axis is linked aperture value change amount Av. Also, the straight line L2 represents a relationship of aperture linked opening amount corresponding to linked aperture value change amount. Since there are variations in individual apertures and there are differences between design values and an actual aperture mechanical characteristic, this straight line L2 differs for each individual product.

In FIG. 6A, if the fact that position of the focus lens 11b is at Xp is detected, a linked aperture value change amount AVp corresponding to this focus lens position Xp is read out from a table that is stored beforehand in the memory 37. Once the linked aperture value change amount AVp has been read out, adjustment values that have been stored in the memory 37 for each individual product are read out in accordance with straight line L2, and aperture linked opening amounts P1-P2 are obtained. It should be noted that linked aperture value change amount AVp corresponding to focus lens position Xp may also be calculated in accordance with a computational expression stored in the memory 37 beforehand.

Figure 7:
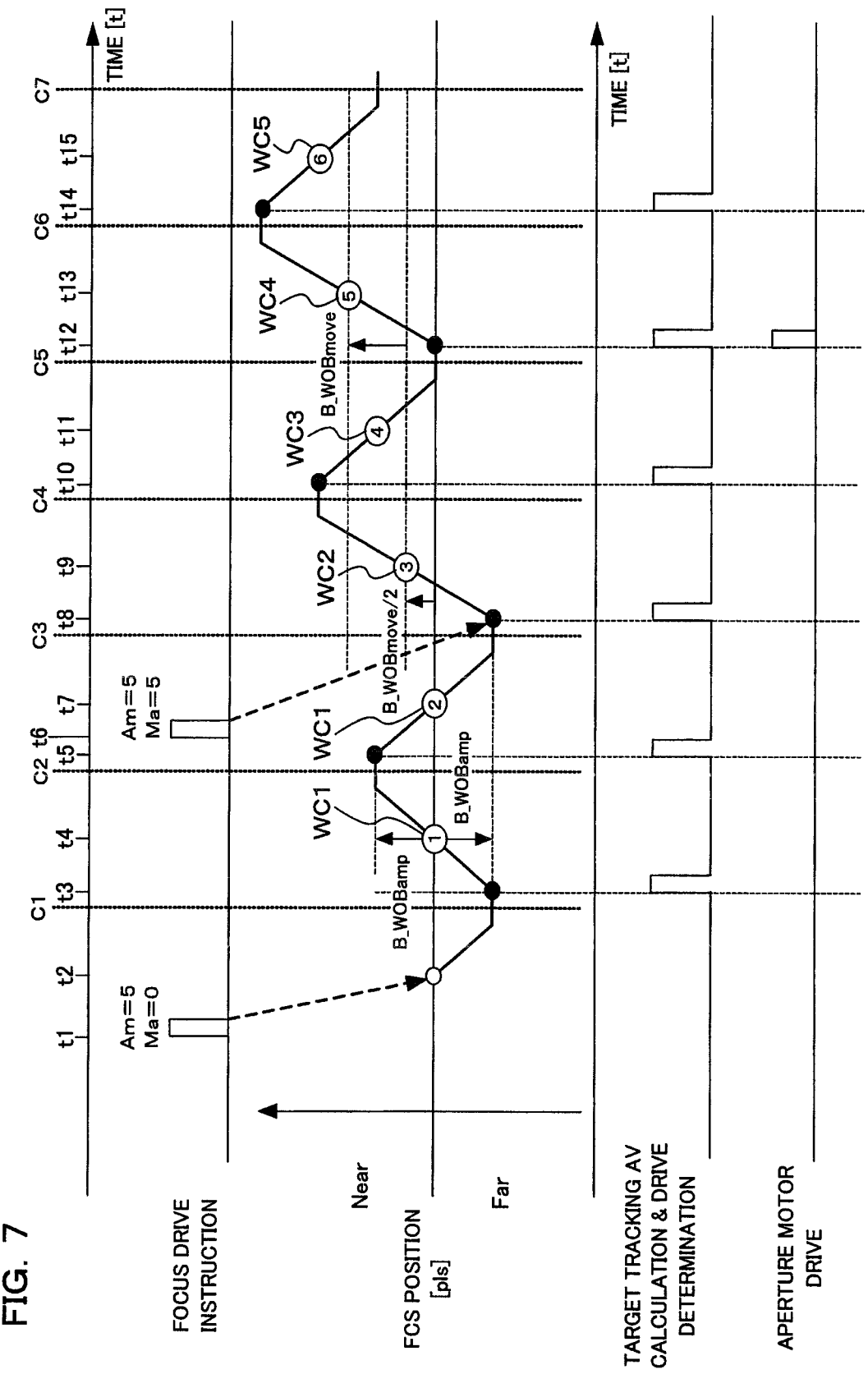
FIG. 7 is a drawing for explaining one example of aperture opening amount control in a case where wobbling drive has been carried out, in a camera of one embodiment of the present invention.

Specifically, with this embodiment, as shown in FIG. 6B, if focus lens (FCS) position change Xp is detected, linked aperture value AVp is calculated based on design values, and aperture linked opening amounts P1-P2 are obtained using adjustment values in this linked aperture value change amount AVp. Drive control of the stepping motor (AVMT 75) is carried out using the aperture linked opening amounts P1-P2 that have been obtained Next, aperture tracking control in a case where wobbling drive has been carried out for the focus lens 11b will be described using FIG. 7. Wobbling drive is a drive method for repeatedly carrying out forward and reverse drive of the focus lens 11b at a fixed amplitude, when carrying out focus detection using a contrast method. Movement of the focus lens 11b at the time of wobbling drive is subjected to tracking control by driving forwards and backwards about wobble centers (Wob Centers) WC1-WC6, as shown in FIG. 7. In carrying out aperture tracking control, opening amount control for the aperture 13 is carried out based on focus lens position Xp, as was described using FIG. 6A and FIG. 6B, but during wobbling drive the normal focus lens position is being driven forwards and backwards. With this embodiment, therefore, tracking control for the aperture is carried out with wobble center (Wob center) for wobbling drive as the focus lens position.

Also, in wobbling drive, there are two operations that can be carried out, namely (1) with the next drive there is a possibility of ascertaining focus lens stopped position beforehand, and (2) in a case where there has been a stop command from the camera body also, wobbling drive is carried out until the next drive. Therefore, with this embodiment, required tracking AV value is calculated beforehand, and the aperture is tracked simultaneously with drive of the focus lens 11b.

Next, one example of the aperture tracking control in FIG. 7 will be described. At time t1, a focus drive instruction is issued with amplitude Am=5 and movement amount Ma=0. This drive instruction is received, and at the time t2 the motor LDMT 73 for focus lens drive within the focus lens drive mechanism 25 commences drive of the focus lens 11b with the amplitude Am and movement amount Ma that have been instructed, and first the focus lens 11b is moved to the far side. C1 in FIG. 7 is an exposure center for an exposure operation of the image sensor 201 that is executed when the focus lens 11b has been moved to the far side. Similarly, C2-C7 are exposure centers at the time of each wobbling operation.

Once time t3 is reached, in order to drive the focus lens 11b at amplitude (Am) 5, it is first moved toward the close-up side by a movement amount of B_WOBamp corresponding to amplitude (Am) 5, up to the center position. Also, at this time, target tracking AV calculation and drive determination are carried out with the focus lens 11b being at the wobbling drive wobble center WC1. If time t4 is reached, the focus lens 11b arrives at the wobbling drive wobble center WC1. Then, in order to set the focus lens 11b to an amplitude of 5, it is moved further from the center position toward the close-up end by a movement amount of B_WOBamp.

Once time t5 is reached, wobbling drive continues with amplitude Am=5 and movement amount Ma=0. Here Drive commences so as to move the focus lens 11b by B_WOBamp towards the far end. Also, at this time, target tracking AV calculation and drive determination are carried out with the focus lens 11b having been set to the wobbling drive wobble center WC1 (but position for time t7).

Once time t6 is reached, a focus drive instruction is issued with amplitude Am=5 and movement amount Ma=5. However, at this point in time, focus lens drive proceeds without changing target position for time t5. If time t7 is reached, the focus lens 11b arrives at the wobbling drive wobble center WC1. At this point in time also, focus lens drive proceeds without changing target position for time t5.

If time t8 is reached, the focus drive instruction that was issued at time t6, namely wobbling drive with amplitude Am=5 and movement amount Ma=5, is carried out. Also, at this time, target tracking AV calculation and drive determination are carried out with the focus lens 11b having been set to the wobbling drive wobble center WC2. This wobble center WC2 is at a position that is more towards the close-up end than wobble center WC1 by B_WOBmove/2 (corresponding to movement amount 5). If time t9 is reached, the focus lens 11b arrives at the wobbling drive wobble center WC2. The focus lens 11b then has amplitude set to 5 and is moved further to the close-up end by B_WOBmove from the wobble center WC2.

Once time t10 is reached, wobbling drive proceeds with amplitude Am=5 and movement amount Ma=5. Subsequently, the wobbling drive proceeds while shifting position of the wobble center until position of the wobble center reaches a point where movement amount Ma=5. In this way, wobbling operation is repeatedly executed, and with this example, it is determined at time point t12 that aperture control is necessary for the wobble center WC4 for at t13 with a tracking drive amount, that will be described later, corresponding to movement amount at that wobble center (WC4-WC1) that exceeds a given threshold value (FIG. 12: S83 to Yes at S91). As a result of this determination, aperture motor driving (driving of the aperture drive motor LDMT 73) based on movement amount of the wobble center (WC4-WC1) is executed at t12, and the opening amount of the aperture 13 is appropriately controlled (FIG. 12: S93).

In this way, aperture tracking control in the case where wobbling drive is performed involves knowing position of a wobble center (WC1-WC5) beforehand, and carrying out target tracking AV calculation and drive determination, and carrying out aperture motor control, with the focus lens 11b positioned at this wobble center.

Next, aperture tracking control at the time of start-up of this embodiment will be described. If power is supplied to the camera body (power on state), the camera body 200 instructs focus lens (FCS) position. If the interchangeable lens 100 is driven to be instructed focus lens position, a drive completion notification is transmitted to the camera body 200. Upon receipt of the drive completion notification by the camera body 200, there is a transition to a shooting standby state (for example, turning a liquid crystal display on etc.).

After startup, if a focus lens stop position is instructed from the camera body 200, the interchangeable lens 100 calculates required tracking AV value based on the focus lens stop position that has been instructed. Using the tracking AV value that has been calculated, tracking drive is completed with priority over the shooting standby state, and with a normal speed parameter (faster that at the time of movie shooting shown below). It is therefore possible to prevent increase in startup time due to tracking drive, by not executing tracking drive after transition to the shooting standby state.

Next, drive speed control at the time of aperture tracking control when performing movie shooting with this embodiment will be described. At the time of movie shooting, together with tracking performance it is desirable to also take into consideration movie flicker and drive noise. Information as to whether or not there is a movie shooting state is transmitted from the camera body 200. The interchangeable lens 100 is made to carry out prevention of flicker and suppression of drive noise by lowering aperture drive speed at the time of movie shooting on the basis of that information. As drive speed, while speed is set to 120 pps@$\frac{1}{16}$ μstep (in the case where $\frac{1}{16}$th of a microstep is made 1 pulse, the pulse rate per second is 120 pulses) in the case of a still picture, for example, in the case of a movie speed is lowered to 60 pps@$\frac{1}{16}$ μstep (in the case where $\frac{1}{16}$th of a microstep is made 1 pulse, pulse rate per second is 60 pulses).

Next, operation for executing the above described aperture drive control will be described using the flowcharts shown in FIG. 8 to FIG. 12. This processing flow is executed by the CPU within the control section 41 controlling each section within the interchangeable lens 100 in accordance with programs that have been stored in the memory 37.

FIG. 8 is a flowchart relating to operation for focus lens-aperture tracking control (FCS-APT tracking). If this flow is entered, first whether a focus lens (FCS) drive command has been received, or focus drive determination, is carried out (S1). In the camera body 200, in order to carry out an AF operation, in the case where the focus lens 11*b* within the interchangeable lens 100 is driven a focus lens drive command is transmitted. In this step, therefore, it is determined whether or not a focus drive command has been received. Also, in order for the photographer to carry out manual focus, there is a rotation operation of the range ring 51, and in this step it is determined whether or not this rotation operation has been performed (FCS drive determination).

In the event that an FCS drive command was received in step S1, or if the result of FCS drive determination is that focus lens drive is carried out, focus lens (FCS) drive is commenced (S3). Here, focus lens drive is commenced for the focus lens drive motor (LDMT 73) within the focus lens drive mechanism 25, by the CPU within the control section 41.

Once FCS drive has been commenced in step S3, it is next determined whether or not a focus lens (FCS) control interrupt has been generated (S5). With this embodiment, generation of a focus lens control interrupt is triggered for carrying out focus lens-aperture (FCS-APT) tracking control. The focus lens control interrupt is generated by focus lens drive, for example, every time a 4 pls movement is carried out. As a result, change in focus lens position is detected every 4 pls, and aperture tracking is carried out in accordance with that position change. It should be noted that with this embodiment an interrupt is generated every 4 pls, but this is not limiting and an interrupt may be generated for a different pls number.

If the result of determination in step S5 is that an FCS control interrupt has been generated, focus lens (FCS) current position pls is acquired (S7). Here, current position pls of the focus lens 11*b* is obtained based on drive pls number of the focus lens drive motor LDMT 73 from the reference position that has been detected by the focus lens reference position detector 27.

Once FCS current position pls has been acquired, next a target tracking AV is calculated (S9). Here, as was described using FIG. 6A, a linked aperture value change amount AVp corresponding to focus lens position (Xp) is obtained. If there is a linear relationship between focus lens position and linked aperture value change amount, the focus lens position may simply be multiplied by a coefficient. If the relationship between focus lens position and linked aperture value change amount is not linear, calculation may be performed using a suitable computational expression. Also, a relationship between focus lens position and linked aperture value change amount may be stored in the memory 37 and the value obtained by table reference, and values between the table entries may be obtained by interpolation calculation. Detailed operation of this target tracking AV calculation will be described later using FIG. 9.

Once target tracking AV has been calculated, it is next determined whether or not current tracking AV is not equal to target tracking AV (S11). Here it is determined whether or not the target tracking AV that was calculated in step S9 is not equal to tracking AV that is currently set. It should be noted that in the determination as to whether the two values are equal or not equal, determination may be based on whether or not a difference between the two AV values is within a given range.

If the result of determination in step S11 is that the current tracking AV and target tracking AV are not equal, tracking drive amount is calculated (S13), and tracking drive determination is carried out (S15). Here, aperture linked opening amounts P1 to P2 are obtained from linked aperture value change amount (AVp), as was described using FIG. 6A and FIG. 6B. Then, if an absolute value of the size of this aperture linked opening amount is larger than a given value, tracking drive is carried out. Detailed operation of this tracking drive amount calculation and tracking drive determination will be described later using FIG. 10.

Once tracking drive determination has been carried out, it is next determined whether or not aperture drive is required (S17). Here, determination is based on a determination result of the tracking drive determination of step S15 (refer to S59 and S61 in FIG. 10).

If the result of determination in step S17 is that aperture drive is required, target tracking AV drive is carried out (S19). Here, opening amount of the aperture 13 is controlled using the aperture drive motor (AVMT 75) within the aperture drive mechanism 21, on the basis of the tracking drive amount that was calculated in step S13. Detailed operation of this target tracking AV drive will be described later using FIG. 11.

If target tracking AV drive has been carried out in step S19, or if the result of determination in step S17 is that aperture drive is not required, or if the result of determination in step S11 is that current tracking AV and target tracking AV equal, or if the result of determination in step S5 is that an FCS control interrupt has not been generated, it is determined whether or not there is focus (FCS) drive completion (S21). Here it is determined whether or not one sequence of focus lens drive has been completed. If focus lens drive has been completed, the stepping motor enters holding excitation. If the result of this determination is that FCS drive has not been completed, processing returns to step S5 and the previous processing is executed.

If the result of determination in step S21 is that FCS drive has been completed, recovery drive is executed (S23). Here, tracking drive of the aperture for the final stopped position, that is, recovery drive, is carried out. With this embodiment, the minimum unit for drive amount of the focus lens 11b is 1 pls and drive amount is not necessarily determined with a multiple of 4. This means that by carrying out recovery drive at the point in time at which one sequence of focus lens drive has been completed (namely, when the focus lens drive motor has stopped and transitioned to holding excitation) the aperture is driven to an intended tracking position. Detailed operation of this tracking drive will be described later using FIG. 12. If recovery drive has been carried out, the flow for focus lens-aperture tracking is terminated Next, operation of the target tracking AV calculation in step S9 will be described using the flowchart shown in FIG. 9. If the flow for target tracking AV calculation is entered, first a relative amount from optical system infinity position pls for the current position of the focus lens 11b is calculated (S31). Here a relative amount is calculated by subtracting optical infinity position pls from focus lens current position that was acquired in step S7. It should be noted that optical infinity position pls has a predetermined value corresponding to optical infinity OI (refer to FIG. 6A).

If relative amount from the optical infinity position of the focus lens 11b has been calculated, it is next determined in whether or not the relative amount is greater than or equal to 0 (S33). Determination here uses the relative amount that was obtained in step S31. If the relative amount is greater than or equal to zero, the focus lens 11b is in either the linked region N or the non-linked region NR2, in FIG. 6A.

If the result of determination in step S33 is that the relative amount is not zero or greater, the value of the relative amount is clipped to "0" (S39). In this case, since the position of the focus lens 11b is between optical infinity OI and control infinity CI which is more to the infinity side than optical infinity (non-linked region NR1 in FIG. 6A.), the relative amount value is set to 0.

On the other hand, if the result of determination in step S33 is that the relative amount is 0 or greater it is determined whether or not the relative amount has a value that satisfies the condition relative amount≤[optical close-up pls]−[optical infinity pls] (S35). Here, it is determined whether or not the relative value that was obtained in step S31 is in the linked region R in FIG. 6A, namely, in a range from optical close-up OC to optical infinity OI.

If the result of determination in step S35 is No, the relative amount value is clipped to [optical close-up pls]−[optical infinity pls] (S37). If the result of determination in step S35 is No, then since the position of the focus lens 11b is between optical close-up OC and control close-up CC which is more to the close-up end than optical close-up OS (non-linked region NR2 in FIG. 6A), then a value of the relative amount is set to a value corresponding to a distance between optical close-up OC and optical infinity OI ([optical close-up pls]−[optical infinity pls]).

If the value has been clipped in step S37, or if the value of the relative amount has been clipped to "0" in step S39, or if the result of determination in step S35 is Yes, next a target tracking AV value is determined (S41). Determination of target tracking AV value here is equivalent to the obtaining of a linked aperture value change amount AVp at position Xp of the focus lens 11b in FIG. 6A (however, there is a difference in that in FIG. 6A there is an absolute aperture value, and in this step S41 a relative aperture value is obtained). The target tracking AV value is calculated using relative position of the focus lens 11b with the condition of optical infinity position pls made a reference.

If the result of determination in step S35 is Yes, the target tracking AV value is calculated by multiplying a relative value that has been calculated in step S31 by a tracking coefficient k. Specifically, the target tracking AV value is determined using equation (2) below.

$$\text{target tracking AV value} = k \times ([FCS \text{ current position pls}] - [\text{optical infinity position pls}]) \quad (2)$$

k: tracking coefficient (design value)

Also, in the event that the relative amount was clipped to "0" in step S39, the target tracking AV value becomes 0. Also, if the relative value was clipped to [optical closer position pls]−[optical infinity position pls] in step S37, then the target tracking AV value becomes a value obtained by multiplying [optical closer position pls]−[optical infinity position pls] by k. In this way, if the relative amount is in the non-linked regions NR1 or NR2, control for the non-linked region (preventing extreme wide-open or extreme close down) is carried out by carrying out clipping processing in accordance with relative amount calculation result It should be noted that in the flowchart shown in FIG. 9 the target tracking AV value has been calculated with equation (2) using a relative position of the focus lens 11b. However, in the event that a relationship between focus lens position and target tracking AV value is not linear another computational expression may be used. Also, a relationship between the focus lens position and the target tracking AV value may be stored before hand in the memory 37 in table form, and retrieved based on the focus lens position.

Next operation of the tracking drive amount calculation of step S13 in FIG. 8 and the tracking drive determination of step S15 will be described using the flowchart shown in FIG. 10. Target tracking AV value is a relative amount, and is replaced in aperture target absolute pls by the flows showing in FIG. 10.

If the flow for tracking drive amount calculation and tracking drive determination is entered, first a target overall AV value is calculated from target tracking AV value (S51). Since the target tracking AV value that was obtained in step S41 (refer to FIG. 9) is a relative amount, the aperture target absolute value is obtained using equation (3) below.

$$[\text{target overall AV value}] = [\text{target infinity AV value}] + [\text{target tracking AV value}] \quad (3)$$

Here, the target infinity AV value is a target AV value for the case where the focus lens 11b is at the optical infinity position.

If target overall AV value has been calculated, next a target absolute pls is retrieved from an AV-pls characteristic (adjustment value) (S53). This retrieval corresponds to obtaining aperture linked opening amount P1-P2 from the linked aperture value change amount AVp in FIG. 6A. Target absolute pls is obtained using a computational expression or table, in accordance with straight line L2 representing a relationship of aperture linked opening amount corresponding to linked aperture value change amount.

Next target relative pls is calculated (S55). The target relative pls is calculated from [target absolute pls]−[current pls]. Here, target absolute pls is obtained in step S53, and current pls is acquired in step S7 (refer to FIG. 8). In this way it is possible to obtain target absolute pls corresponding to target overall AV value, in accordance with mechanical characteristics of individual products (adjustment values).

If target relative pls has been calculated, it is next determined whether or not −1<[target relative pls No.]<1 (S57). Aperture drive in previously described step S19 is carried out in the basis of target relative pls, but with this embodiment, if an absolute value of target relative pls No. is smaller than 1 drive is not carried out.

If the result of determination in step S57 is Yes, it is determined that drive is not necessary (S59). On the other hand, if the result of determination is No, it is determined that drive is required (S61). In this way, if the target relative pls No. that was calculated in step S55 becomes greater than or equal to the aperture drive minimum resolution (1 pls), it is determined that drive is necessary, while if the target relative pulse No. is less than the minimum resolution it is determined that drive is not necessary. In previously described step S17, the determination is based on a determination result for these steps S59 and S61. If determination has been performed in steps S59 and S61, the originating flow is returned to.

It should be noted that with this embodiment a determination threshold has been set to 1 pls, but this is not limiting and another value may also be used. In this case if determination is in accordance with aperture drive minimum resolution, it is possible to exert the best possible performance of the aperture drive mechanism. A determination threshold may be set to 2 pls, for example, in accordance with the required exposure precision, and may be changed in accordance with conditions.

Figure 11:
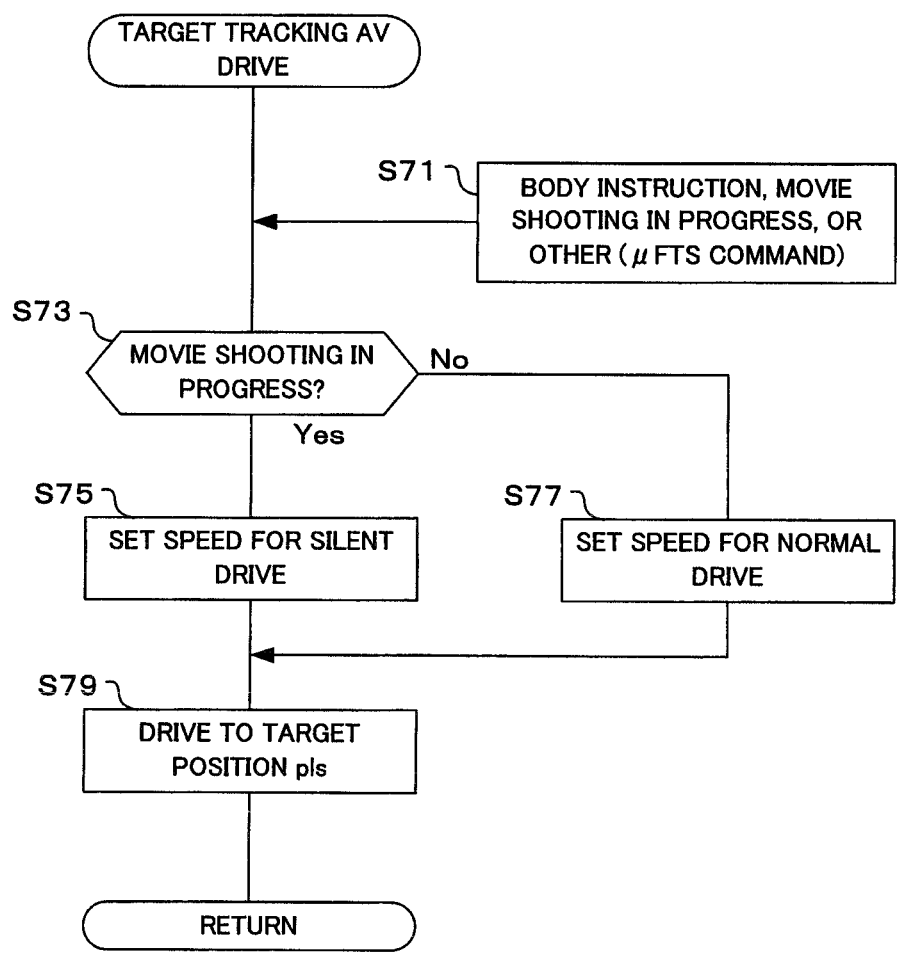
FIG. 11 is a flowchart for explaining operation of target tracking AV drive, in a camera of one embodiment of the present invention.

Next, the target tracking AV drive of step S19 (refer to FIG. 8) will be described using the flowchart shown in FIG. 11. In the flow for target tracking AV drive the aperture drive mechanism 21 performs drive control of opening amount of the aperture 13 based on the target relative pls that was calculated in step S55. Also, at the time of this drive, drive speed of the aperture drive motor (AVMT 75) of the aperture drive mechanism 21 differs in accordance with whether or not movie shooting is in progress.

If the flow for target tracking AV drive is entered, a command for movie shooting in progress or another command is received from the camera body 200 (S71). Here, the camera body 200 transmits state of the camera body, such as whether or not there is a movie shooting state, to the interchangeable lens 100 at a given time.

It is next determined whether or not movie shooting is in progress (S73). Here, determination is based on an instruction from the camera body 200 that was obtained in step S71. If the result of this determination is that movie shooting is not in progress, speed for normal drive is set (S77). In this case, since it is still picture shooting or the like, because there is no need to take into consideration noise at the time of aperture drive and image flicker due to aperture variation, speed for normal drive is set as the aperture drive speed.

If the result of determination in step S73 is that movie shooting is in progress, speed for silent drive is set (S75). During movie shooting, it is standard practice to also record audio at the same time, and noise being generated at the time of aperture drive is unfavorable. Also, if the aperture 13 changes suddenly brightness of a subject image will change suddenly causing flicker in a movie, which is unfavorable. For this reason speed for silent drive, which is slower than speed for normal drive, is set.

If aperture drive speed has been set in steps S75 or S77, next there is drive to the target position pls (S79). Here the aperture drive motor (AVMT 75) of the aperture drive mechanism 21 executes drive for the target relative pls that was calculated in step S55, namely drive to the target position pls, at the speed that was set in step S75 or S77, and an aperture opening amount corresponding to the target position pls is set. If drive to the target position pls has been performed the flow for target tracking AV drive is terminated and the originating flow is returned to.

In the flow for target tracking AV drive, a controller sets speed for changing the aperture opening amount using the aperture motor to a speed at which tracking is possible at the maximum movement velocity of the focus lens group (refer to S75 and S77). The controller also controls the aperture motor in accordance with still picture shooting mode and movie shooting mode, and makes speed for tracking with movement velocity of the focus lens group slower for a case of movie shooting mode than for the case of still picture shooting mode.

Figure 12:
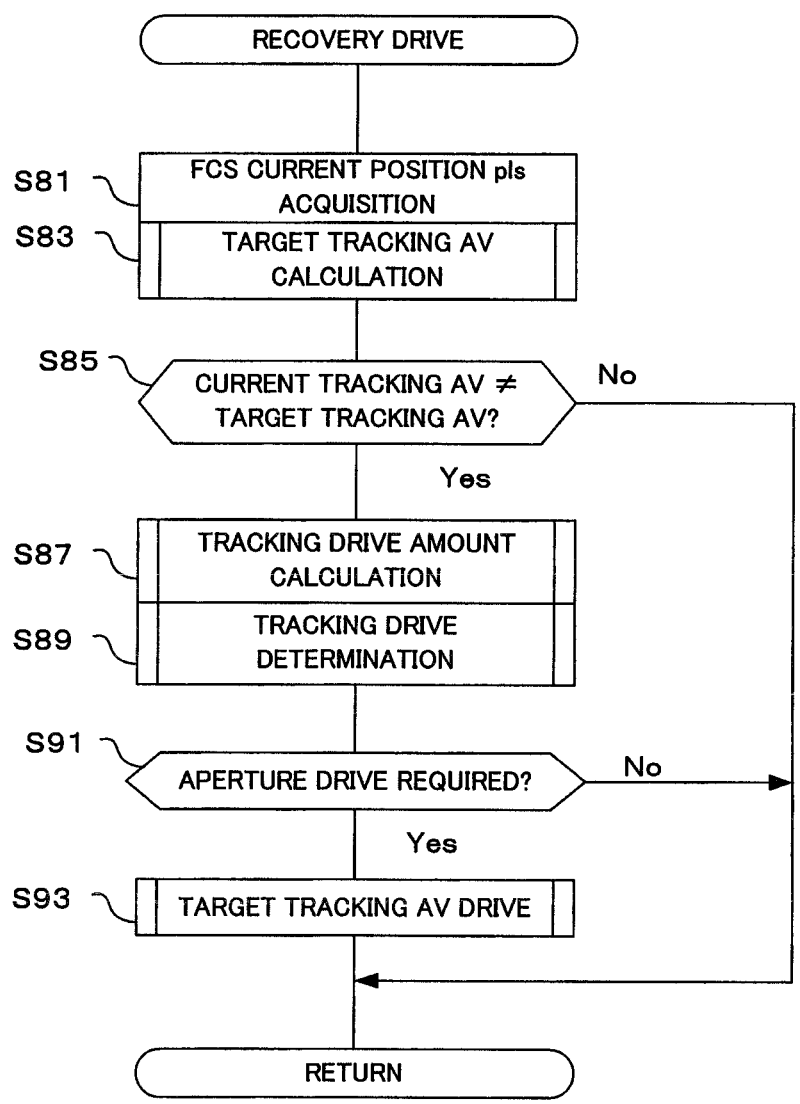
FIG. 12 is a flowchart for explaining a recovery operation, in a camera of one embodiment of the present invention.

Next, detailed operation of recovery drive in step S23 (refer to FIG. 8) will be described using the flowchart shown in FIG. 12. If it has been determined that focus lens drive has been terminated in step S23 (refer to FIG. 8), the aperture is driven to an intended tracking position by carrying out this recovery drive.

If the flow for recovery drive is entered, first the current position pls of the focus lens (FCS) is obtained (S81). Here, the newest focus lens position is detected at the point in time that focus lens drive was completed. The current position pls of the focus lens 11b, similarly to step S7, is obtained based on Pls number for drive amount by which the LDMT 73 was driven from the reference position that was detected by the focus lens reference position detector 27.

If the FCS current position pls has been acquired, next target tracking AV calculation is carried out (S83). Here, similarly to step S9, a linked aperture value change amount AVp corresponding to focus lens position (Xp), in FIG. 6A, is obtained.

It is next determined whether or not current tracking AV is not equal to target tracking AV (S85). Here it is determined whether or not the target tracking AV that was calculated in step S83 is not equal to tracking AV that is currently set. It should be noted that in the determination as to whether the two values are equal or not equal, determination may be based on whether or not a difference between the two AV values is within a given range.

If the result of determination in step S85 is that the current tracking AV and target tracking AV are not equal, tracking drive amount is calculated (S87), and tracking drive determination is carried out (S89). Here, processing similar to previously described S13 and S15 is executed.

Once tracking drive determination has been carried out, it is next determined whether or not aperture drive is required (S91). Here, determination is based on a determination result of the tracking drive determination of step S89 (refer to S59 and S61 in FIG. 10).

If the result of determination in step S91 is that aperture drive is required, target tracking AV drive is carried out (S93). Here, similarly to step S19, opening amount of the aperture 13 is controlled by driving the aperture drive motor (AVMT 75) within the aperture drive mechanism 21, on the basis of the tracking drive amount that was calculated in step S87.

If target tracking AV drive has been carried out in step S93, or if the result of determination in step S91 is that aperture drive is not required, or if the result of determination in step S85 is that the current tracking AV is equal to the target tracking AV, the flow for recovery drive is terminated and the originating flow is returned to.

It should be noted that with this embodiment, as was described previously, there is a possibility of the focus lens 11b being subjected to a wobbling operation (refer to FIG. 7). In this case, a controller controls aperture opening amount by calculating opening amount corresponding to position of the focus lens group in accordance with wobble center position for the wobbling operation. Specifically, pls of a wobble center position of the wobbling operation is acquired as current position pls in step S7 of FIG. 8, and aperture drive control is carried out by obtaining target tracking AV value etc. using this obtained pls.

As has been described above, one embodiment of the present invention involves calculating the appropriate aperture value based on first information, representing a relationship between position of a focus lens group and appropriate aperture value, and position of the focus lens group that will be moved by a focus lens motor (refer, for example to the AVp calculation in the second quadrant portion of FIG. 6A, S9 in FIG. 8 etc.), calculating an aperture opening amount based on second information, representing a relationship between aperture value and aperture opening amount, and the aperture value that has been calculated (refer, for example, to calculation of P1 and P2 in the first quadrant of FIG. 6A, S13 in FIG. 8 etc.), and controlling aperture opening amount using the aperture motor (refer, for example, to S19 in FIG. 8 etc.).

As a result it is possible to carry out control to give good aperture opening amount precision. It is possible to carry out control with good aperture opening amount precision in order to hold descriptive performance of the optical system at a fixed level in accordance with position of the focus lens group. Even in the case of variations between each of individual components, it is possible to improve precision due to the fact that there is the second information as adjustment values in accordance with individual products.

It should be noted that in the one embodiment of the present invention, the first information is stored as a computational expression that uses a coefficient k (referred to equation (1)), and the second information is stored in a table as adjustment values. However, this is not limiting, and the first and second information may be stored in tables, and the first the second information may be stored as computational expressions.

Also, the one embodiment of the present invention has been described for a case where a photographing optical system is a single focal point optical system. However, the photographing optical system may be a zoom optical system, and in this case first information representing a relationship between position of the focus lens group and appropriate aperture value, and second information representing a relationship between values for aperture and aperture opening amount are stored in accordance with zoom position using the zoom optical system, appropriate aperture value is calculated based on the first information and position of the focus lens group, aperture opening amount is calculated based on the second information and the aperture value that has been calculated, and the aperture opening amount is controlled to the opening amount that has been calculated.

Also, with the one embodiment of the present invention, the control section 41 has been constituted by a CPU and its peripheral circuits. However, this is not limiting, and it is possible to have a hardware structure such as gate circuits generated based on a programming language that is described using Verilog, and also to use a hardware structure that utilizes software such as a DSP (digital signal processor). Suitable combinations of these approaches may also be used.

Also, with this embodiment, an optical instrument for taking pictures has been described using a digital camera, but as a camera it is also possible to use a digital single lens reflex camera or a compact digital camera, or a camera for movie use such as a video camera, and further to have a camera that is incorporated into a mobile phone, a smart phone, a mobile information terminal, personal computer (PC), tablet type computer, game console etc. In any event, it is possible to adopt the present invention as long as an optical instrument has an aperture mechanism.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An optical instrument, comprising:
an optical system including a focus lens group;
an aperture that restricts light flux that passes through the optical system;
a focus lens motor that causes the focus lens group to move in an optical axis direction;
an aperture motor that sets an opening amount of the aperture;
a memory that stores first information that represents a relationship between positions of the focus lens group and first aperture values and second information that represents a relationship between the first aperture values and opening amounts of the aperture; and
a controller that (1) controls the focus lens motor to cause a wobbling operation of the focus lens group, (2) determines a first aperture value based on the first information and a current center wobble position of the focus lens group, (3) determines an opening amount of the aperture based on the second information and the first aperture value that has been determined, and (4) controls the aperture motor to reach the opening amount of the aperture that has been determined.

2. The optical instrument of claim 1 wherein:

the memory further stores a first position of the focus lens group associated with an optical close-up position of the focus lens group, and a second position of the focus lens group associated with an optical infinity position of the focus lens group; and the controller, responsive to a determination that the current center wobble position of the focus lens group that has been driven by the focus lens motor is not between the first position and the second position, controls the aperture motor to reach an opening amount of the aperture to an aperture value associated with the first position or an aperture value associated with the second position.

3. The optical instrument of claim 2, wherein:

the controller sets a speed of changing opening amount of the aperture using the aperture motor to a speed at which it is possible to track maximum movement speed of the focus lens group.

4. The optical instrument of claim 3, wherein:

the controller controls the aperture motor in accordance with a still picture shooting mode and a movie shooting mode, and makes a speed for tracking with movement speed of the focus lens group slower for the movie shooting mode than for the still picture shooting mode.

5. The optical instrument of claim 1, wherein:

the optical system includes a zoom optical system; and the memory stores the first information and the second information in association with zoom positions of the zoom optical system.

6. The optical instrument of claim 1 wherein:

the controller sets a speed of changing opening amount of the aperture using the aperture motor to a speed at which it is possible to track maximum movement speed of the focus lens group.

7. The optical instrument of claim 6 wherein:

the controller controls the aperture motor in accordance with a still picture shooting mode and a movie shooting mode, and makes a speed for tracking with movement speed of the focus lens group slower for the movie shooting mode than for the still picture shooting mode.

8. The optical instrument of claim 1 wherein the controller further, responsive to a determination that the center position for the wobbling operation exceeds a specified threshold value, performs control so that the aperture opening amount is set to the opening amount that has been determined.

9. An aperture control method for an optical instrument having an optical system including a focus lens group, an aperture that restricts light flux that passes through the optical system, a focus lens motor that causes the focus lens group to move in an optical axis direction, an aperture motor that sets an opening amount for the aperture, and a memory that stores first information that represents a relationship between positions of the focus lens group and first aperture values and second information that represents a relationship between the first aperture values and opening amounts of the aperture, the aperture method comprising:

controlling the focus motor to cause a wobbling operation of the focus lens group;

determining a first aperture value on the basis of the first information and a current center wobble position of the focus lens group that has been moved by the focus lens motor;

determining an opening amount of the aperture on the basis of the second information and the first aperture value that has been determined; and controlling the aperture motor to reach the opening amount determined.

\* \* \* \* \*